(12) United States Patent
Tsagkaris et al.

(10) Patent No.: US 9,942,085 B2
(45) Date of Patent: Apr. 10, 2018

(54) EARLY WARNING AND RECOMMENDATION SYSTEM FOR THE PROACTIVE MANAGEMENT OF WIRELESS BROADBAND NETWORKS

(71) Applicant: Incelligent P.C., Athens (GR)

(72) Inventors: Kostas Tsagkaris, Athens (GR); Panagiotis Demestichas, Athens (GR); Serafeim Kotrotsos, Drossia (GR); Dimitris Cardaris, Nikaia (GR); Aristotelis Margaris, Athens (GR)

(73) Assignee: Incelligent P.C., Athens (GR)

( * ) Notice: Subject to any disclaimer, the term of this patent is extended or adjusted under 35 U.S.C. 154(b) by 0 days.

(21) Appl. No.: 15/648,367

(22) Filed: Jul. 12, 2017

(65) Prior Publication Data
US 2018/0019910 A1    Jan. 18, 2018

Related U.S. Application Data

(60) Provisional application No. 62/361,907, filed on Jul. 13, 2016.

(51) Int. Cl.
*H04W 28/18* (2009.01)
*H04L 12/24* (2006.01)
(Continued)

(52) U.S. Cl.
CPC ....... *H04L 41/0609* (2013.01); *G06N 99/005* (2013.01); *H04B 7/04* (2013.01);
(Continued)

(58) Field of Classification Search
CPC ........... H04L 41/0609; H04L 43/0817; H04W 64/006; H04W 24/02; H04W 28/18; H04B 7/04; G06N 99/005
See application file for complete search history.

(56) References Cited

U.S. PATENT DOCUMENTS

| 2004/0039968 A1* | 2/2004 | Hatonen | G06K 9/6284 714/39 |
| 2007/0066298 A1* | 3/2007 | Hurst | H04W 24/00 455/423 |

(Continued)

FOREIGN PATENT DOCUMENTS

| EP | 2750432 | 7/2014 |
| WO | 2016068926 | 5/2016 |

OTHER PUBLICATIONS

Written Opinion of the International Searching Authority in corresponding International Application No. PCT/IB2017/054226, 8 pages, dated Oct. 30, 2017.

(Continued)

*Primary Examiner* — Chuong A Ngo
(74) *Attorney, Agent, or Firm* — Lessani Law Group, PC

(57) ABSTRACT

The present disclosure relates to an early warning and recommendation system for proactive management of a wireless broadband network. Without human intervention, the system processes highly heterogeneous network and non-network data and applies unsupervised machine learning to the data to predict and understand the situations that lead to different network state conditions. More specifically, unsupervised clustering is applied to the data to understand "situations" that can lead to non-normal network state conditions. A deep neural network model of situations is then created to further understand the underlying data relationships between the elements of a situation and network states. The deep neural network model and Reinforcement Learning is used to provide recommendations as to changes in network configuration parameters to improve the state of a predicted situation associated with non-normal network conditions. The system displays warnings and recommen- (Continued)

dations regarding predicted non-normal network conditions in a user interface for a network operator.

18 Claims, 8 Drawing Sheets

(51) Int. Cl.
G06N 99/00 (2010.01)
H04W 24/02 (2009.01)
H04B 7/04 (2017.01)
H04W 64/00 (2009.01)
H04L 12/26 (2006.01)

(52) U.S. Cl.
CPC ......... *H04L 43/0817* (2013.01); *H04W 24/02* (2013.01); *H04W 28/18* (2013.01); *H04W 64/006* (2013.01)

(56) References Cited

U.S. PATENT DOCUMENTS

| | | | |
|---|---|---|---|
| 2007/0195695 A1* | 8/2007 | Healy | H04L 41/5067 370/230 |
| 2012/0020216 A1 | 1/2012 | Vashist et al. | |
| 2014/0068348 A1 | 3/2014 | Mondal et al. | |

OTHER PUBLICATIONS

International Search Report in corresponding International Application No. PCT/IB2017/054226, 4 pages, dated Oct. 30, 2017.

* cited by examiner

EARLY WARNING AND RECOMMENDATION SYSTEM FOR THE PROACTIVE MANAGEMENT OF WIRELESS BROADBAND NETWORKS

RELATED APPLICATIONS

This application claims the benefit of U.S. Provisional Application No. 62/361,907, filed on Jul. 13, 2016, and titled "Early Warning and Recommendation System for the Proactive Management of Wireless/Mobile Broadband Networks," the contents of which are incorporated by reference herein as if fully disclosed herein.

BACKGROUND OF THE INVENTION

1. Field of the Invention

This invention relates generally to wireless/mobile broadband networks and, more specifically, to an early warning and recommendations system for proactive management of wireless/mobile broadband networks.

2. Description of the Background Art

A vital challenge in wireless networks is to operate, at any point of time and space, at the optimal point, with respect to the Quality of Service/Experience (QoS/QoE) offered and the associated resources consumed. The QoS/QoE offered and the resources consumed have a direct impact on the operator's revenues and the associated costs, respectively. Therefore, the operation at a corresponding optimal point is vital for the success and sustainability of the operators, in the current and future highly-competitive environment.

The achievement of the optimality described above is a very complex objective. Factors contributing to the complexity are:

- The existence of more (or less) users and the change of their requirements, in time and space.
- The proliferation of devices of various capabilities.
- The existence of more services and the heterogeneity of their requirements. According to recent approaches services can be classified as Mobile Broadband (MBB), Machine Type Communications (MTC) or Mission Critical Communications (MCC).
- The powerful, yet more heterogeneous, infrastructure. There is emergence and integration of diverse technologies and resources, e.g., a wide range of spectrum bands, diverse RATs (Radio Access Technologies), heterogeneous cell layers, virtualized core networks, powerful and expanded data centers, and advanced infrastructure operational modes including SON (Self-Optimizing Network systems).
- The fierce competition among different services for spectrum that pushes the spectrum costs up and augments the need for spectrum efficiency.
- The highly volatile, and often unpredictable, telecommunication (telco) and non-telecommunication (non-telco) conditions that crucially influence the user mobility and density and service demand and provision, in each location and time period. Non-telco conditions include events occurring in particular times/areas, the weather, the street traffic conditions, etc. Telco conditions comprise marketing and infrastructure information, and they are modeled through various Key Performance Indicators (KPIs) that describe the performance (including quality offered) and health of the system.
- The need for operation that is sustainable from the perspective of the impact on the environment. There is the requirement for resource consumption (and associated service provision) in a manner that contributes to the sustainability of our physical ecosystem. There is demand for mitigation of the environmental/energy footprint of telecommunication services.
- The need for operation that is most competitive from the financial perspective. There is a financial environment that is relentlessly competitive and challenging. Therefore, there is a constant and pressing need for cost reductions, in conjunction with the generation and exploitation of new revenue sources.
- The market factors' impact to service demand and customer behavior, i.e., telco marketing actions as offers and promotions that boost use and demand, competition respective actions, that influence service use/loyalty, and other market factors change as consumer index, tax burden, etc.

The problem of operating at optimal points, with respect to the quality offered and the resources consumed, has always been important. Now it is more important than ever due to the more dynamic and competitive environment, the competing or demand sharing services (e.g. 3G/4G/Wi-Fi and forthcoming 5G) and the existence of many sources of complexity (as introduced above).

Currently, one way in which the problem is addressed is through the overprovisioning of resources as an outcome of worst-case oriented planning. However, this is inefficient from a cost perspective. Another way is through attempts to reactively find the optimal operating points (e.g., through the Self Organizing/Optimizing Network (SON) concept). Often configurations are derived in a manual manner. Unfortunately, this reactive approach may not be fast or stable enough or can lack the bird's eye view, since, in many situations, it is computationally feasible only at distributed level. Due to the existence of so many complexity sources, the quest for the optimal operating points (in terms of quality offered and resources needed), per service area region and associated time period, requires the timely solution of computationally hard problems. Therefore, it is practically very difficult, if not impossible, to operate in (or solely based on) a reactive mode (which means to find the optimal operating point, where/when situations of inefficient/improper service provision occur). Therefore, it is important to have appropriate early warning and recommendation systems, which can: (i) provide foresights regarding upcoming situations of sub-optimality, i.e., regarding time periods and area regions in which there can be improper (from the quality perspective) or inefficient (from the resource consumption perspective) service provision; (ii) suggest ways of handling these situations targeting a globally optimized, proactive management which takes into account holistic and longer term variabilities rather than short term ones.

As it can be deduced from the discussion above, the needed early warning and recommendation systems, in order to be useful/comprehensive, should take into consideration (have as input) the following highly-heterogeneous issues: the changing requirements of users/devices/applications/services, the changing telco and non-telco conditions influencing the service provision, and the characteristics/potentials of the infrastructure.

SUMMARY OF THE DISCLOSURE

The present disclosure relates to an early warning and recommendation system for proactive management of a wireless broadband network. The system receives as input highly heterogeneous network and non-network data, such as (1) data related to network components (e.g., cell ID, cell location, configuration parameters and associated time stamps; (2) KPI indicators for the network and associated time stamps; and (3) non-network data and associated time information, such as weather or customer profile information in relevant locations. Without human intervention, the system processes the data and applies unsupervised machine learning to the data to predict and understand the situations that lead to different network state conditions (e.g., critical, poor, and normal). More specifically, the system applies unsupervised clustering to the data to understand "situations" that can lead to non-normal network state conditions. The system then creates a deep neural network model of situations to further understand the underlying data relationships between the elements of a situation and network states. The system combines the deep neural network model with reinforcement learning (e.g., Deep Q-Network) to provide recommendations as to changes in network configuration parameters that will improve the state of a predicted situation associated with non-normal network conditions. The system displays warnings and corresponding recommendations regarding predicted non-normal network conditions in a user interface residing on a human network operator's computing device.

BRIEF DESCRIPTION OF THE DRAWINGS

FIG. 2 is an example Situations table.

FIG. 3 is an example re-constructed Situations table using deep neural networks.

FIG. 4a is an example table that illustrates the distance between Situation states in the network.

FIG. 4b is an example table that illustrates the probabilities associated with transitioning from one Situation state to another.

DETAILED DESCRIPTION OF THE PREFERRED EMBODIMENTS

The present disclosure relates to a system, method, and computer program for automatically providing early warning of future non-normal network conditions in a wireless/mobile broadband network ("network" or "communications network") and for providing recommendations for remedying such conditions. The methods described herein are performed by a computer system, which is referred to as the "Analyzer" herein.

As described in more detail below, the Analyzer dynamically identifies and exploit the notion of network "situations" and their "optimal handling" without human intervention by performing machine learning on large amounts of heterogeneous data. The Analyzer eliminates the need for a human expert operator to perform time-consuming work of defining all the critical situations in the managed wireless/broadband system. Instead, through unsupervised machine learning and use of deep neural networks, the Analyzer is able to extract knowledge from very large and highly complex data sets containing communications network and non-network data (which traditional database tools are not suited to process) in order to understand communications network situations and their optimal handling. The machine learning algorithms performed by Analyzer enable it to detect interesting and unforeseen relationships in the data, of which is difficult or impossible for operator experts to be explicitly aware.

Figure 1A:
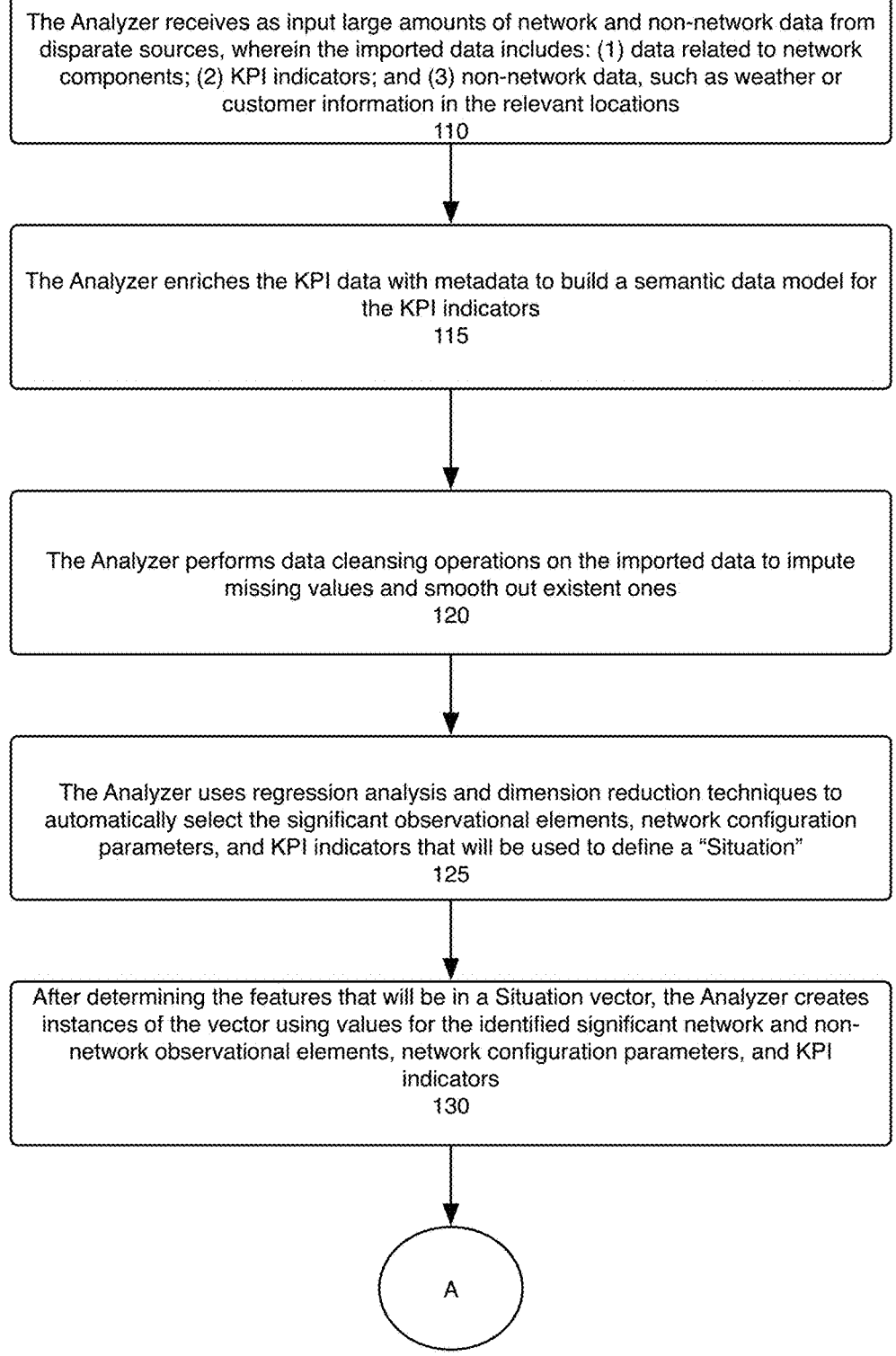
FIGS. 1A-1D are flowcharts that illustrate a method, according to one embodiment, for providing warning and recommendations related to non-normal network conditions.
Figure 1B:
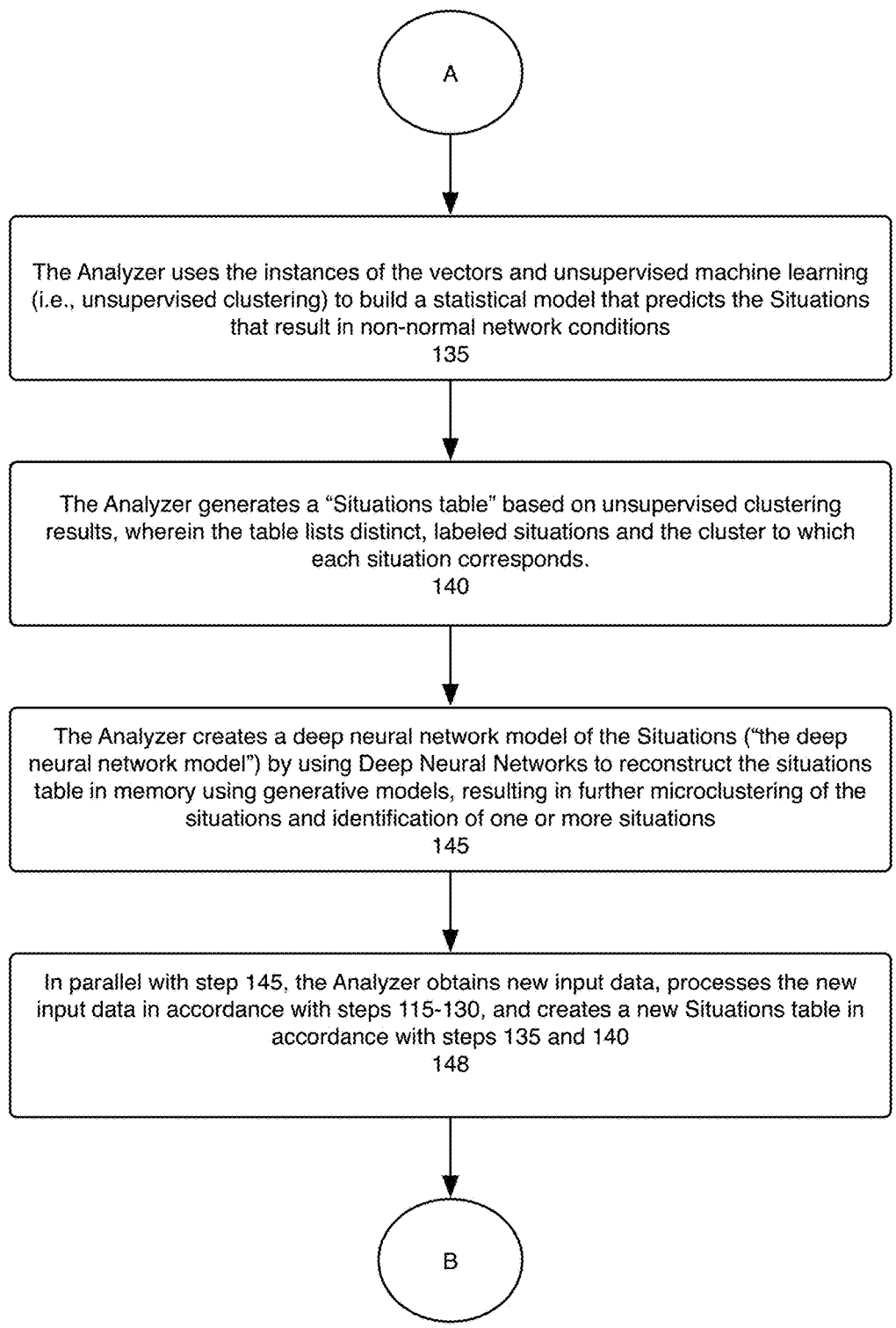
Figure 1C:
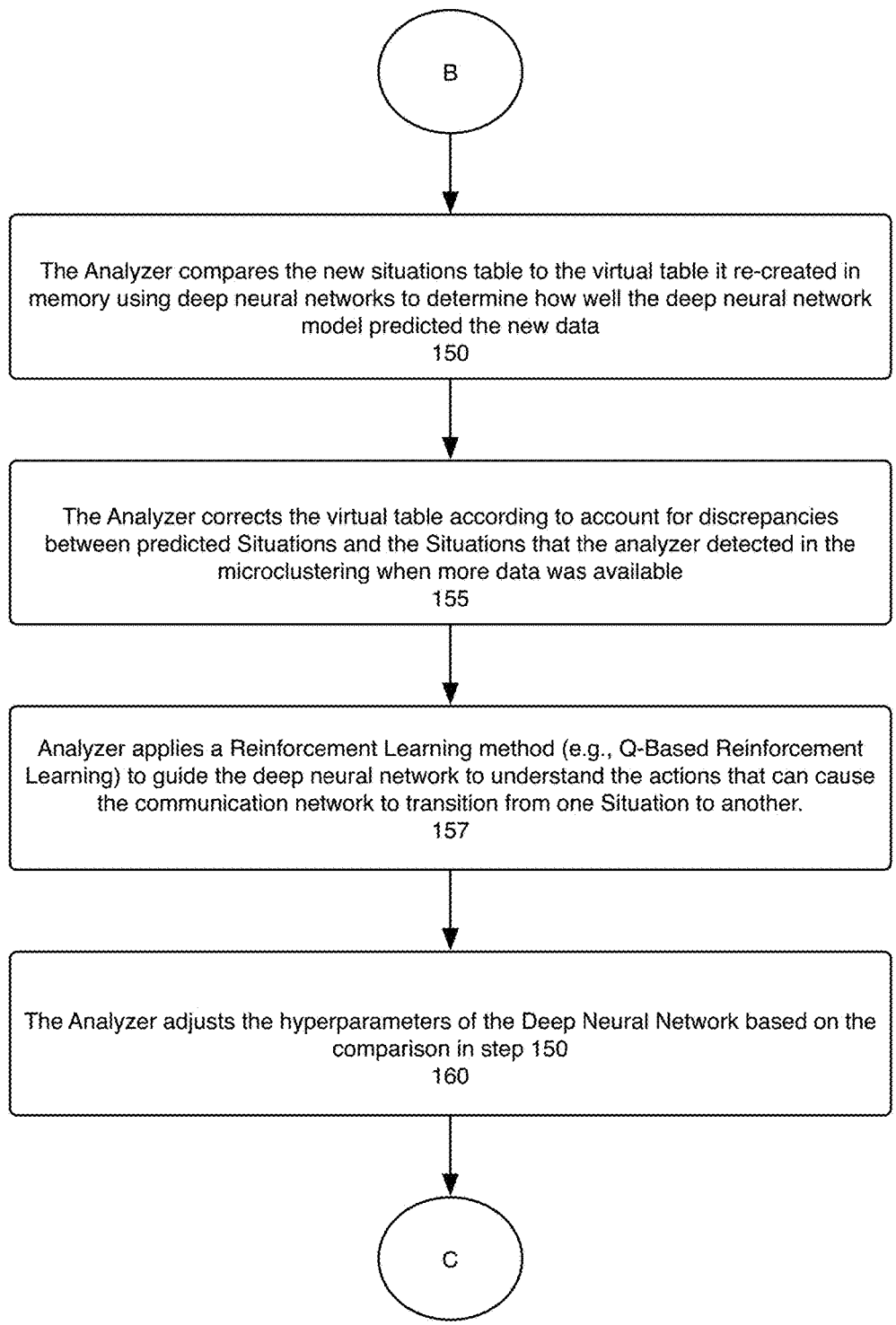
Figure 1D:
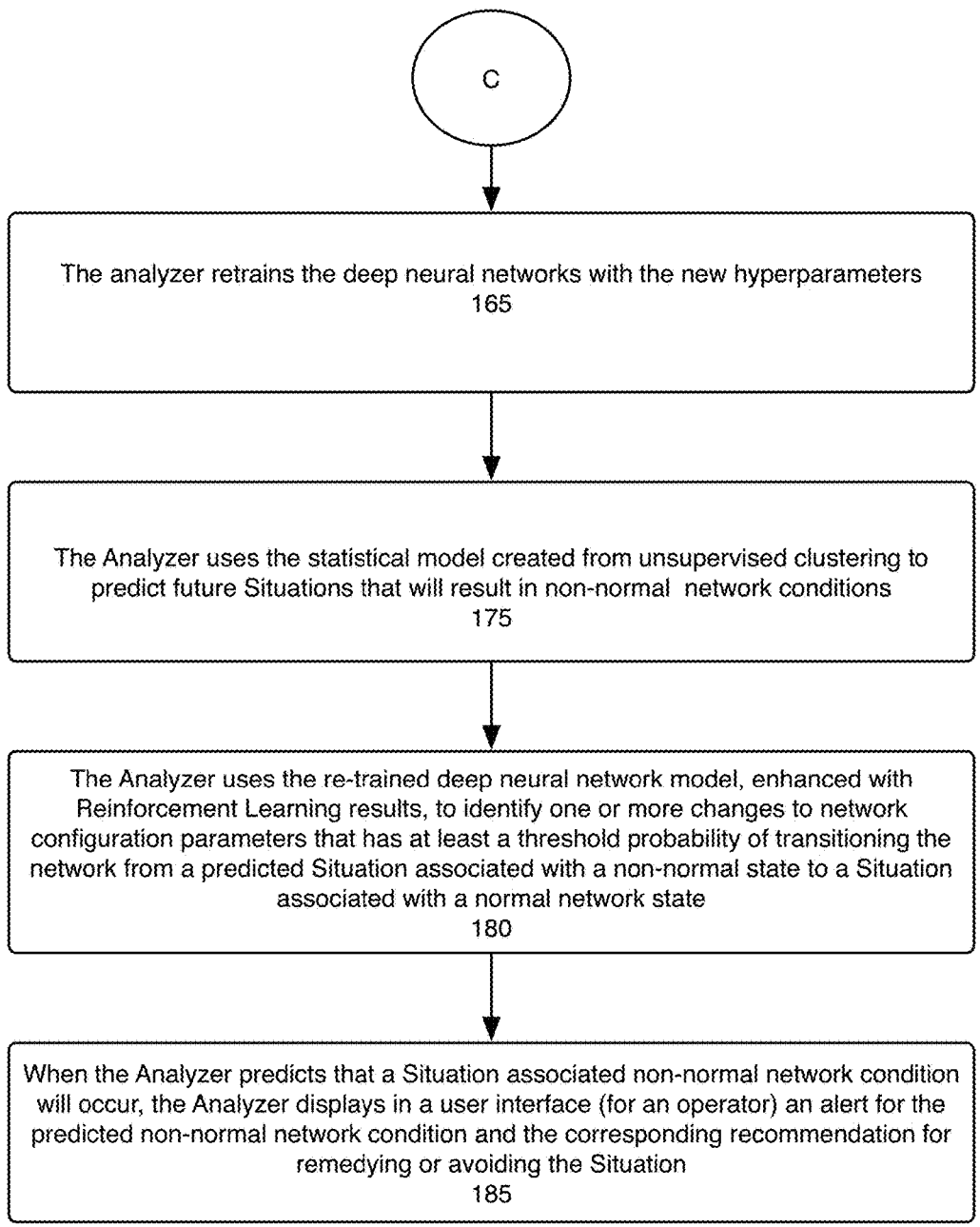
Figure 5:
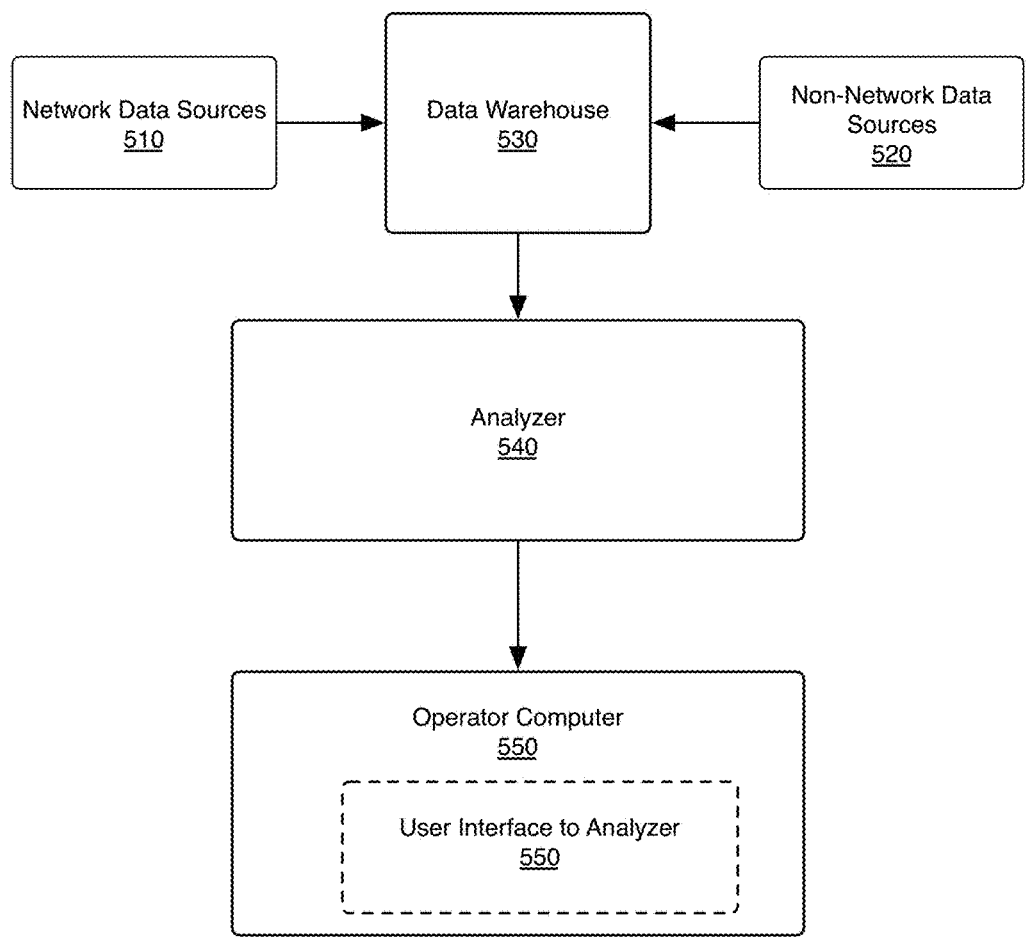
FIG. 5 is a block diagram that illustrates an example system architecture.

FIG. 5 illustrates the system context in which the Analyzer resides. As discussed in more detail below, heterogeneous network and non-network data 510, 520 is imported into a data warehouse 530. Without human intervention, the Analyzer 540 processes the data and applies unsupervised machine learning to the data to understand and predict the situations that lead to different communications network conditions (e.g., critical, poor, and normal). The Analyzer displays warnings and corresponding recommendations regarding predicted non-normal network conditions in a user interface 550 residing on a human network operator's computing device 560.

FIG. 1 illustrates the operation of the Analyzer. The steps of FIG. 1 are described in more detail below.

Importing, Preparing, and Selecting Data

The Analyzer receives as input large amounts of data in a data warehouse from disparate sources, wherein the imported data includes: (1) data related to communications network components (e.g., cell ID, cell location, configuration parameters and associated time stamps; (2) KPI indicators for the communications network and associated time stamps; and (3) non-network data and associated time information, such as weather or customer information in the relevant locations (step 110). More specifically, the input data may include location components (areas, regions, GPS coordinates if available etc.) as retrieved from communications network planning systems, information on the communications network elements (base stations, access points) and their characteristics retrieved from planning/inventory systems and associated with the regions are covering, network performance/fault management data typically residing in and retrieved from EMSs, NMSs/OSSs, CEMs or other management systems), customer type related data (retrieved from CRM systems and denoting types of customers), usage data (number of voice calls, volume of data calls etc.), mobility level characteristics (e.g., high, low, medium level), weather information (temperature, humidity levels etc. or predefined classes such as rain, sunny etc.) obtained from interfaces with weather information sources, and social posts obtained from interfaces with social media.

In importing the data into the data warehouse, the data is gathered in an agnostic way from either relational SQL database (MySQL, Oracle) or NoSQL (MongoDB, Cassandra). An ORM abstraction layer that implements polyglot persistence may be used in gathering the data. In order for the system to be flexible in processing big data pipelines, an underlying lambda architecture for parallel computations that apply equally to the whole importing process (i.e., the whole ETL process) may be employed. For example, technologies from the Hadoop ecosystem may be used, such as Apache Spark for micro-batch, Apache Flink for stream processing, and Apache Storm for complex event processing in data streams.

The Analyzer enriches the KPI data in the data warehouse with metadata in order to interpret KPI indicators (i.e., build a semantic data model for the KPI indicators) (step 115). The Analyzer obtains the metadata by loading predefined conceptual data model for KPI indicators.

With the predefined conceptual data model, the Analyzer creates a knowledge graph endowed with ontologies of KPIs that mirror their pair-wise relation within the real-world. This enables the Analyzer to determine how to interpret the KPI indicators. For example, the metadata defines what is considered "critical," "poor," and "normal" performance. In other words, the metadata enables the Analyzer to assign a communications network state (e.g., critical, poor, normal, etc.) to a combination of KPI indicator values.

The Analyzer may also enrich other imported data with metadata. For example, if social media data and customer management information are present, then the Analyzer may obtain metadata from a predefined conceptual data model for sentiment analysis.

The Analyzer performs data cleansing operations on the imported data to impute missing values and smooth out existent ones (step 120). The imported data inevitably is heavily corrupted with redundant information and noise. This stands as an obstacle for any machine learning pipeline to exploit the dataset and extract valuable information from it. The Analyzer is able to automatically address this in a two-fold process, described in steps 120 and 125 described herein.

In the first part of process to prepare the data for exploitation, the Analyzer applies data cleansing operations (e.g., imputation of missing values, smoothing out already existent ones) to the data, followed by standard data wrangling transformations, namely: normalization, scaling, pivoting, aggregation, rounding, percentile binning, one-hot encodings and feature hashing. For data of temporal-spatial nature, de-seasonality and de-trending procedures are performed respectively to time-series to reduce the variance and the bias. Furthermore, in the presence of textual data (e.g., data from social media) the Analyzer automatically performs all the mandatory natural language processing operations, that is to say: dictionary creation, tokenization, stemming, lemmatization and vectorization. For all the above operations, the Analyzer can use standard data manipulation libraries (e.g., Pandas, SciPy and NLTK).

The Analyzer then uses regression analysis and dimension reduction techniques to automatically select the significant communications network and non-network observational elements, communications network configuration parameters, and KPI indicators that will be used to define a "Situation" (step 125). A "Situation" is represented by a vector (or other dynamic mathematical structure) comprising (a) key communications network and non-network observational elements, such as communications network components involved (e.g., cell IDs), location/area information for the communications network elements (e.g., latitude and longitude of cells), environmental conditions in those locations/areas during a specific time period (e.g., weather information), and information related to customer groups in those locations/areas during a specific time period; (b) network configuration parameters of the communications network components involved; and (c) KPI indicators obtained under the above observation parameters in (a) and network configuration parameters in (b). In other words, each Situation is defined as an abstract vector in an abstract higher-dimensional vector space, say $\vec{s}=(x_1, \ldots, x_k, y_1, \ldots, y_l, z_1, \ldots, z_m) \in X \times Y \times Z \subset R^{n(k+l+m)}$, where the first subset of components, $x_1, \ldots, x_k$, refers to the observational elements (e.g., space-time, cell ID, weather, etc.); the second, $y_1, \ldots, y_l$, refers to network configuration parameters; and the third one, $z_1, \ldots, z_m$, refers to KPIs, respectively. "Observational elements" are imported data elements that are not configuration parameters and not KPI indicators.

To select which observational elements, network configuration parameters, and KPI indicators will be used in a Situation vector, the Analyzer performs feature engineering operations that enable the Analyzer to select significant features and generate new ones. The Analyzer performs feature selection by using step-wise regression (e.g., Lasso methods) and by running continuous statistical significance tests through information-theoretic criteria (Akaike, Bayesian) and probing with various latent variable models. This way only the most important features in the imported data that persist in significance will be selected by the Analyzer. In addition, the feature extraction process may create new features out of existing ones from such mathematical operations.

The feature engineering operations also include dimensionality reduction methods to avoid sparsity issues (e.g., curse of dimensionality) in the feature space. Dimension reduction is performed using either linear methods, such as Principal Component Analysis (PCA), or more advanced manifold learning embedding techniques such as t-SNE to capture non-linear correlations.

After determining the features that will be in a Situation vector, the Analyzer creates instances of the vector using values for the identified significant network and non-network observational elements, network configuration parameters, and KPI indicators (step 130).

Using Unsupervised Machine Learning to Predict Situations that Result in Non-Normal Network Conditions The Analyzer uses the instances of the vectors and unsupervised machine learning to build a statistical model that predicts the Situations that result in non-normal network conditions (step 135). Specifically, the Analyzer performs unsupervised clustering on the Situation vectors, which results in groupings of situations that behave similarly. For instance, the system can automatically group Situations based on the communications network state associated with the situation (e.g., "critical," "poor," and "normal"). The communications network state is determined by the KPI indicators associated with the situation. The KPI semantic model created in step 115 enables the Analyzer to understand the combination of KPI values that correlate to normal and non-normal (e.g., critical or poor) network conditions. In other words, "non-normal" and "normal" communications network conditions are defined by KPI values.

In one embodiment, the Analyzer performs a variety of unsupervised clustering methods and selects the best model from the different methods. The Analyzer performs multiple k-fold cross validation tests on random samples of small sizes to evaluate each model separately. This guarantees that the model selected always fits the data better than any other available. The Analyzer may interface with existing state-of-the art machine learning frameworks and libraries (e.g., Scikit-Learn) to perform the unsupervised clustering.

Figure 2:
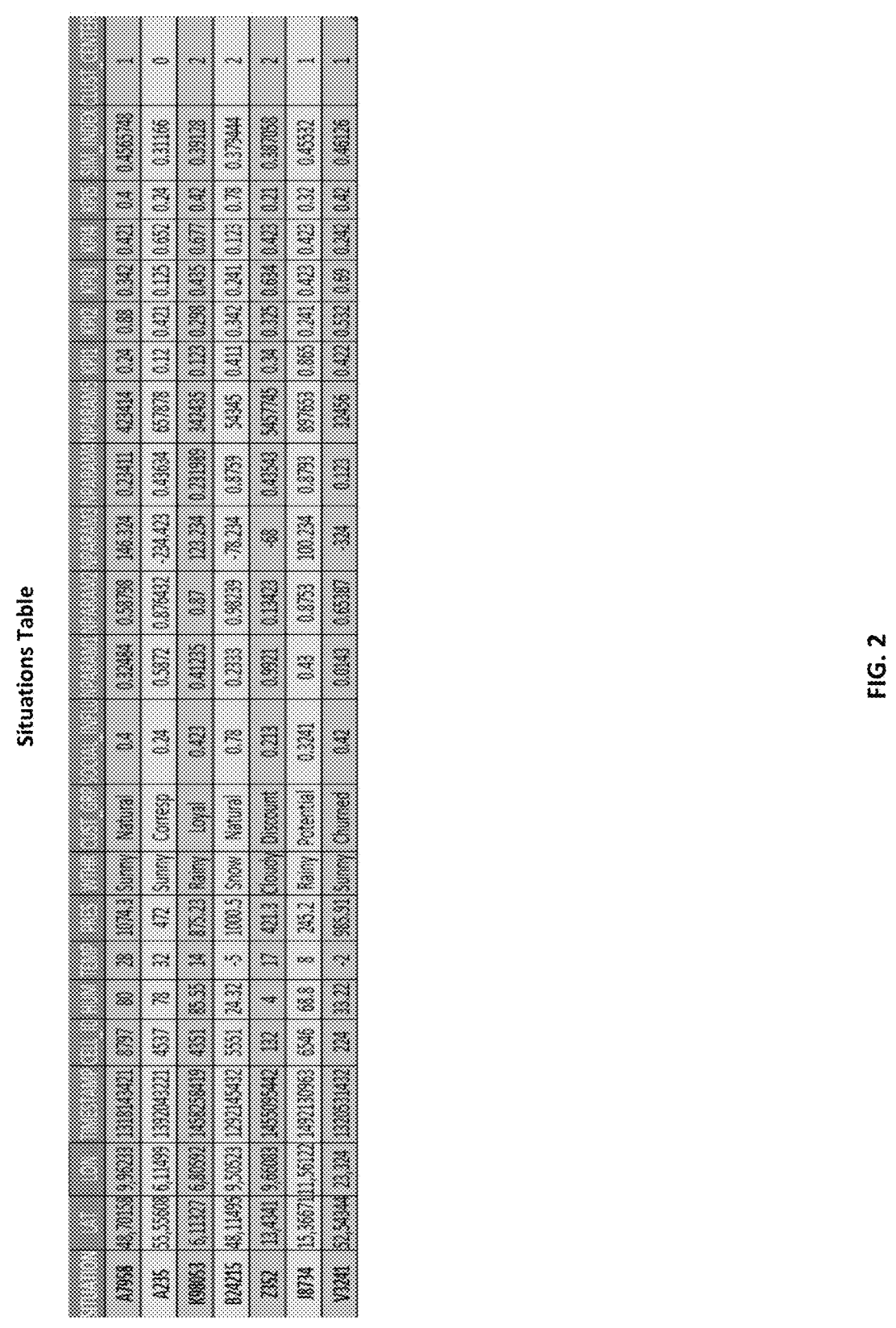

The Analyzer generates a "Situations table" based on unsupervised clustering results (step 140). The Situations table lists distinct, labeled Situations, each of which is fully defined by a subset of features, and table also includes the cluster to which each Situation belongs. An example of a portion of a Situations table is illustrated in FIG. 2.

As seen, all the available data can be decomposed in the form of a table of n rows of Situations. A Situation with a particular label will be characterized by specific numerical and categorical-integer values. Each Situation is a point in the abstract feature space, which means that slight differences in the values between different KPIs will correspond to different Situations as well. That way, a great number of different Situations can be captured by the system.

The last column in the table indicates the cluster in which each Situation resides. The value of the column indicates the communications network state (based on KPI indicators)

associated with the Situation. For this particular table, we have 0, 1, 2 for critical, poor, and normal Situations, respectively. The Situations table is saved in a format that can be used by any distributed storage system (e.g., HDF5) for fast-processing.

Creating a Deep Q-Neural Network Model to Acquire Knowledge that Enables Analyzer to Make Recommendations The Analyzer creates a deep neural network model of the Situations ("the deep neural network model") by using a deep neural network to reconstruct the situations table in memory using generative models, resulting in further microclustering of the situations and identification of one or more situations (step 145). This results in the analyzer having a deeper understanding of relationships between Situation elements and communications network states (i.e., network conditions). In one embodiment, the Analyzer, which is capable of metaheuristic reasoning, uses a Deep Belief Network architecture for a Deep Q-Network (implemented with stacked Long Short-Term Memory neural networks (LSTMs), variation autoencoders (VAEs), or stacked restricted Boltzmann machines (RBMs)) to reconstruct the table internally in memory, using generative models.

Figure 3:
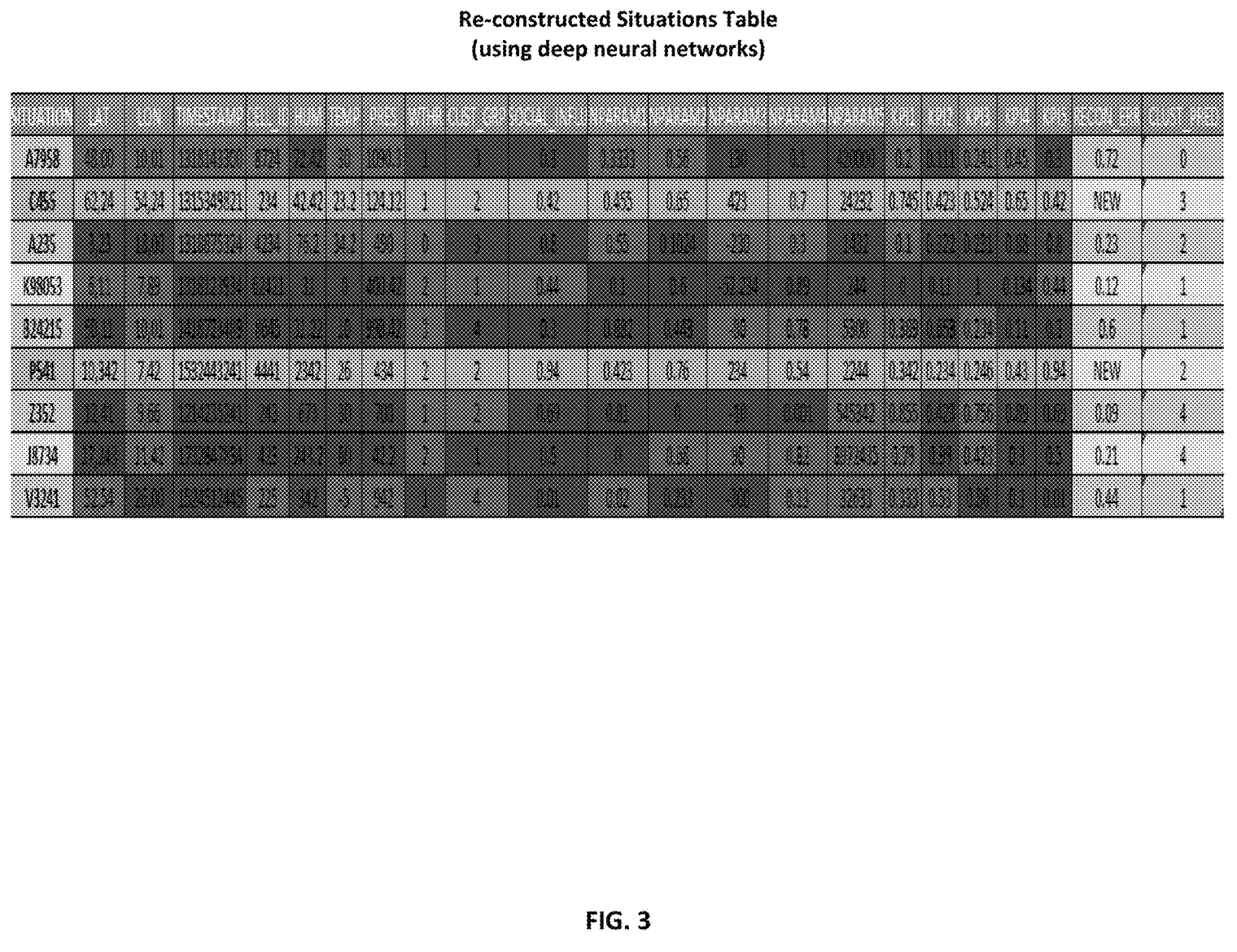

FIG. 3 illustrates a human-readable form of an example re-constructed table based on the Situations table of FIG. 2. The scale of shades from pale to darker corresponds to numerical differences. The second and six rows reveals the discovery of the existence of two additional Situations. The last column, predicts that the first of them corresponds to a totally new "behavioral cluster" of Situations. where in our example would have the intuitive meaning of "better than cluster 2" (which recall means "normal"). The behavior cluster arises from the microsegmentation that occurs in rebuilding the table, which results in an ordered set of indexed cluster behaviors.

While the deep neural networks reconstruct the input situations up to a known time instance, they generate increasingly deeper and more complex intermediate representations of the underlying probability distributions lying inside clusters. This results in a clearer understanding of the underlying structure of the communications network infrastructure that is hiding along the vast amount of data. As time passes, the deep neural network learns how to account for the trade-off in the so-called "exploration-exploitation dilemma" and therefore masters the traversal in the space of virtual Situations. This is important, as the deep neural network becomes quickly familiar with time instances of particular states, especially with respect to communications network configuration parameters and KPIs, of which Analyzer is not aware yet. It also makes visible the hidden pairwise relationships that might exist between those states by generating its own novel temporary features that considers significant for inductive reasoning and generalization.

In summary, creating the deep neural network model for recommended actions enables the Analyzer to better understand relationship between Situation elements, and, therefore, better understand how changing a one or more communications network configuration parameters, will affect the communications network state associated with a Situation at a given time and affect the communications network state at later times. The deep neural network model is described in more detail below with respect to step 180.

In parallel with step 145, the Analyzer obtains new data (i.e., new data is imported into the data warehouse), processes the new data in accordance with steps 115-130, and creates a new Situations table in accordance with steps 135 and 140 (step 148). When the clustering of Situations takes place again and completes, due to an increment in data volume and potential concept drifts found in the underlying probability distributions, the result is a micro-segmentation with stricter decision boundaries of the already existent Situations as well as the addition of new clusters of Situations. The new Situations table reflects this more refined understanding of Situations.

The Analyzer then compares the new situations table to the virtual table it re-created in memory using deep neural networks to determine how well the deep neural network model predicted the new data (step 150). The Analyzer corrects the virtual table to account for discrepancies between predicted Situations and the Situations that the Analyzer detected in the microclustering when more data was available (step 155). Furthermore, the Analyzer applies a reinforcement learning method (e.g., Q-Based Reinforcement Learning) to guide the deep neural network to understand the actions (i.e., change in network configuration parameters) that can cause the communications network to transition from one Situation to another (step 157), resulting in a Deep Q-Network implementation that is used to learn and store the attained knowledge on actions. This Deep Q-Network is described in more detail below with respect to step 180.

The Analyzer also adjusts the hyperparameters of the deep neural network based on the comparison in step 150 (step 160). The hyperparameters are adjusted to address any Situations that were previously clustered into the wrong behavior group (i.e., a bad prediction). Examples of hyperparameters of a deep neural network are number of hidden layers or units, learning rates, batch sizes, epochs parameters, dropout parameters, and regularization parameters.

The analyzer retrains the deep neural networks with the new hyperparameters (step 165). In this way, the deep neural network (the Deep Q-network) fine tunes itself and, thus, approximates the real-world dynamics better, based on fluctuations found between predicted Situations and actual Situations as they appear in the system. This process results in a deeper understanding by the Analyzer of relationships between the elements that define a Situation. This enables the Analyzer to provide better predictions and recommendations for avoiding non-normal communications network conditions.

Providing Warning of Non-Normal Conditions and Providing Recommended Actions

The Analyzer uses the statistical model created from unsupervised clustering to predict future Situations that will result in non-normal communications network conditions (step 175). In other words, the Analyzer uses the statistical model to determine whether any Situations associated with non-normal network conditions are likely to arise at some future point. Because of the time component in each row and the segmentation of situations clusters based on the communications network state (e.g., "critical," "poor," "normal," etc.), the system can provide incident detection by time series and regression analysis with constraints/thresholds coming from the human operator. For example, it can predict the value of any KPI in some future time point (e.g., in 1 hour, Monday evening) given some particular communications network parameter configuration and environment condition context and produce a warning after comparing that predicted value against an operator's threshold (e.g., drop call rate <10%). Thereafter, the Analyzer validates this result using standard hypothesis testing techniques for confidence bands.

The Analyzer then combines the re-trained deep neural network model with the reinforcement learning results to identify one or more changes to network configuration parameters that has at least a threshold probability (e.g., 0.8) of changing the state of the predicted Situation to a normal communications network state while having negligible side effects on the longer-term (i.e., beyond the time frame of the Situation) condition of the communications network (step 180). The deep neural network provides the Analyzer with an understanding of the distance between Situation states, and this understanding enables the Analyzer to predict how changes in one or more communications network configuration parameters will enable the communications network to move from one state to another. From all the potential actions, the Analyzer selects an optimal action as described below.

The steps in FIG. 1 are performed iteratively, and, as the Analyzer continuously refines the deep neural network model, it increases its ability to predict how changes in communications network configuration parameters will affect the communications network. As changes are made to communications network configuration parameters over time from various Situations, the Analyzer captures, using Reinforcement Learning techniques (e.g., Q-Based Reinforcement Learning), the resulting effect on KPIs, both immediately and in longer-term communications network performance.

In one embodiment, Q-based Reinforcement Learning is used to obtain the Reinforcement Learning data and recommend actions (i.e., changes in network configuration parameters). In its simplest implementation, Q-based Reinforcement Learning results in a Q-table with the following columns:

TABLE 1

| State (Situation) | Action (Situation handling) | Performance of Action taken when in State (KPI value (s)) | Degree of confidence (Probability) |
|---|---|---|---|
| ... | ... | ... | ... |
| ... | ... | ... | ... |

An "action" is a change in one or more communications network configuration parameters. Each row in the table indicates how an action taken in a given Situation is expected to affect KPI values. When an action is actually taken in a Situation, the Analyzer is able to assess how well it predicted the corresponding KPI values (immediately and longer-term) and adjust the deep neural network model accordingly. Over time, this increases the degree of confidence the Analyzer has in the effect an action will have on a Situation (immediately and longer term).

In reality, the huge number of possible Situations in a network makes it impossible to maintain the Q-based Reinforcement Leaning results in a conventional table. Instead, the Analyzer effectively maintains this information in the above-described deep neural network (e.g., a Deep Q-Neural Network). The deep neural network predicts how far each Situation is from each other Situation in terms of the least number of steps to move from one Situation (i.e., state) to another. In one embodiment, the deep neural networks are initially trained with historical data from a network operators databases.

Figures 4A, 4B:
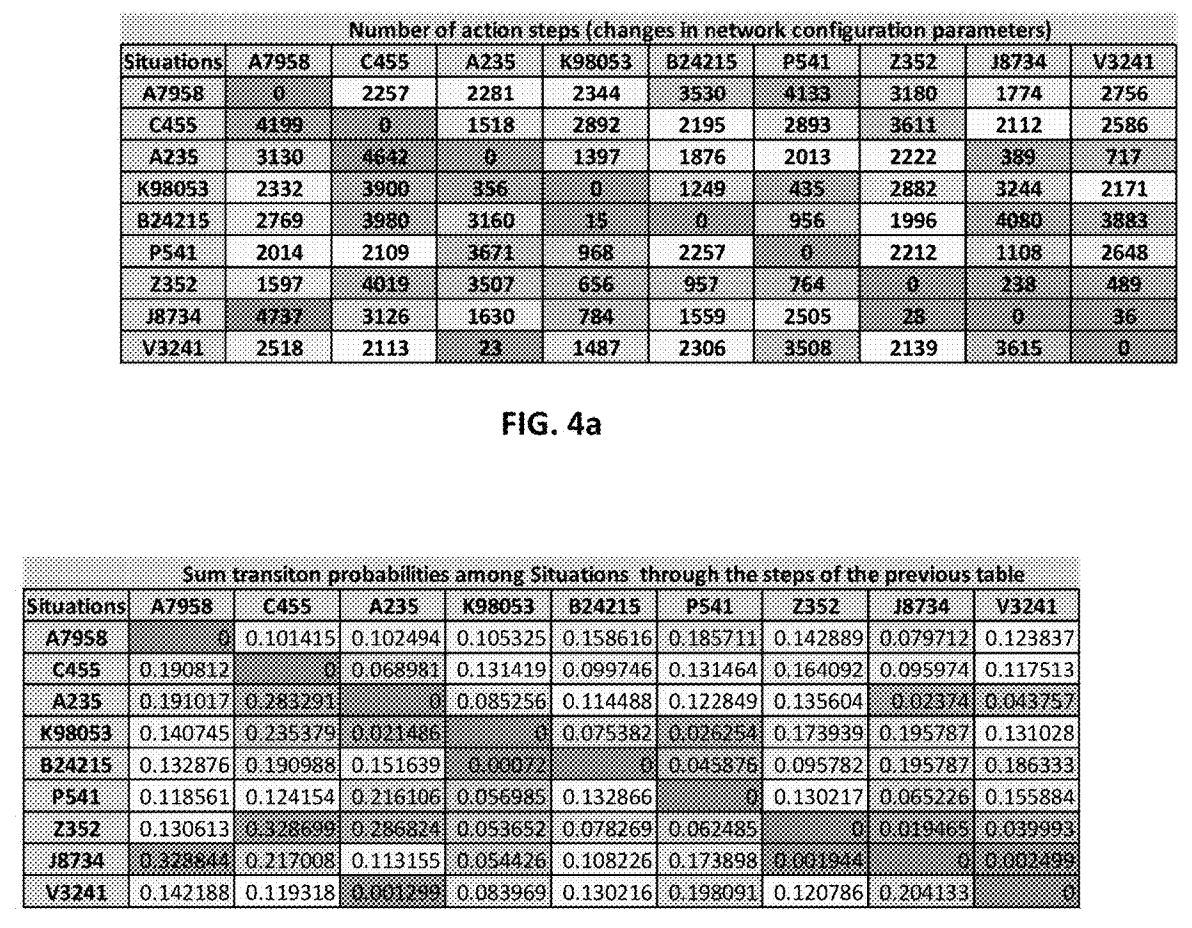

The tables in FIGS. 4a and 4b illustrate how the internal information processed by the deep neural networks would look like in human-friendly form. The table in FIG. 4a depicts the expected total number of sequential steps (i.e., actions) required to reach one Situation (column) from another Situation (row) in some random time instance. A "step" represents an action that transition the communications network from one state to another. If there are multiple steps between two Situations, then the transition involves going through intermediate Situations. As the system collects more data on the communications network over time, it is usually able to reduce the number of steps (i.e., actions) identified to move from one Situation to another, such that the path between many Situations may be reduced to a single step.

The table in FIG. 4b is a stochastic matrix with the multi-step transition probabilities among Situations (i.e. the sum probabilities for reaching one Situation (column) from another Situation (row), by taking the steps (actions) shown in the corresponding cells in the table in FIG. 4a). The higher the value of the cell, the higher the probability of a successful transition. Cells with values smaller than 0.1 indicate a highly improbable transition. It should be noted that a large number of steps does not necessarily mean small probability and vice versa. For Situations associated with KPIs below a specified threshold, the Analyzer eventually identifies an optimal action for the Situation. An optimal action is one that, with a threshold degree of confidence, will move the communications network from such a Situation to an improved Situation (i.e., a state with better KPI values) by changing only one or a "few" communications network configuration parameters, wherein a "few" may be defined by an administrator of the Analyzer or configurable by a communications network operator. In one embodiment, recommended actions are only those in which a Situation can be improved in one step with a threshold degree of confidence.

As stated above, an action is a change to one or more communications network configuration parameters. An example of an action is adjusting the antenna tilt of a communications network element. The tilt angle is a network configuration parameter. For instance, the value of the parameter may have three discrete values 0, +15, −15. As part of the Reinforcement Learning process, the system observes and explores the effect on communications network performance when the configuration parameter takes on different values under specific time, location, weather, etc. conditions. In this example, the action involves one network configuration parameter, but other actions could involve changes to multiple network configuration parameters. The Analyzer may use a simulator to simulate possible actions and fine tune the deep neural network and the transition probability matrices, thereby further improving its predictions and recommendations.

When the Analyzer predicts that a Situation associated with a non-normal network condition will occur, the Analyzer displays in a user interface (for an operator) an alert for the predicted non-normal network condition and the corresponding recommendation for remedying or avoiding the Situation (step 185). The recommendation is based on an optimal action identified as discussed above. This offers the operator proactive capabilities in monitoring and decision making process about network issues and abnormalities.

Examples of the types of alerts that may be generated are:
"Probability x % that a cell will encounter a y % load level at a specific time/date range.
"Probability x % that cells {a,b} will be congested on Tuesday evening."
"Probability x % that a cell will be underutilized between hh:mm and hh:mm"

In one embodiment, a communications network operator is able to query, through the user interface, the Analyzer as to a recommended action to optimize one or more KPI values. For example, the operator may query how to maximize cell throughput while maintaining a drop call rate below 10%. In this example, "cell throughput" and "drop call rate" are KPI indicators for the communications network. The system identifies one or more "target Situations" with observational elements that match current network and non-network conditions and KPI indicators corresponding to the operator's query and determines a recommended action to transition the network from a current Situation to one of the target Situations. The system is able to derive a recommendation from the knowledge of the distance between Situations in the deep neural network.

The processes described with respect to FIG. 1 are repeated each time the Analyzer obtains new data, which is may be on a continuous or periodic basis. Moreover, those skilled in the art will understand that, despite being displayed serially, many steps in FIG. 1 are performed in parallel as new data arrives. Furthermore, the order in which the steps are performed may vary, depending on the implementation.

The methods described herein are embodied in software and performed by one or more computer systems (each comprising one or more computing devices) executing the software. A person skilled in the art would understand that a computer system has one or more memory units, disks, or other physical, computer-readable storage media for storing software instructions, as well as one or more processors for executing the software instructions.

As will be understood by those familiar with the art, the invention may be embodied in other specific forms without departing from the spirit or essential characteristics thereof. Accordingly, the above disclosure is intended to be illustrative, but not limiting, of the scope of the invention, which is set forth in the following claims.

The invention claimed is:

1. A method, performed by a computer system referred to as the "Analyzer," for providing early warning of future non-normal wireless network conditions and for providing recommendations for remedying predicted non-normal conditions, the method comprising:
   the Analyzer receiving as input data imported from disparate sources into a data warehouse, wherein the imported data includes: (1) data related to network components; (2) key performance (KPI) indicators for the network and associated time stamps; and (3) non-network data;
   the Analyzer building a semantic data model for the KPI indicators by enriching the KPI indicators with metadata;
   the Analyzer performing data cleansing operations on the imported data;
   the Analyzer using regression analysis and dimension reduction techniques on the cleansed, imported data to automatically identify significant network and non-network observational elements, network configuration parameters, and KPI indicators for use in defining a situation related to the network, wherein observational elements include network components IDs, location information for such network components, and environmental conditions in said locations;
   the Analyzer creating vectors that each define a situation related to the network, wherein each vector comprises values for the identified significant network and non-network observational elements, network configuration parameters, and KPI indicators;
   the Analyzer using unsupervised machine learning to build a statistical model that predicts the situations that result in non-normal network conditions, wherein building the statistical model comprises performing unsupervised clustering of the vectors based on network state;
   the Analyzer generating a situations table based on unsupervised clustering results, wherein the table lists distinct, labeled situations and the cluster to which each situation corresponds;
   the Analyzer creating a deep neural network model of situations ("the deep neural network model") by using deep neural networks to reconstruct the situations table in memory, resulting in further microclustering of the vectors and identification of one or more new situations;
   the Analyzer importing new data from disparate sources into the data warehouse and creating a new situations table using the new data;
   the Analyzer comparing the new situations table to the table reconstructed using the deep neural network model ("the DNN table") to determine how well the deep neural network model of situations predicted the new data;
   the Analyzer applying a Reinforcement Learning method to the new and previously-imported data to guide the deep neural network model to understand how changes to network configuration parameters affect situations;
   the Analyzer adjusting the hyperparameters of the deep neural network model based on the comparison of the new situations table to the DNN table accordingly;
   the Analyzer retraining the deep neural networks model with the adjusted hyperparameters;
   the Analyzer using the statistical model created from unsupervised clustering to predict a future non-normal network situation;
   the Analyzer using the deep neural network model and Reinforcement Learning results to identifying one or more changes to network configuration parameters that has at least a threshold probability of moving the predicted non-normal situation to a normal network state; and
   the Analyzer displaying in a user interface an alert for the predicted non-normal network situation and a corresponding recommendation for remedying the predicted non-normal network situation, wherein the recommendation is based on the one or more identified changes to network configuration parameters that has at least a threshold probability of moving the predicted non-normal situation to a normal network state.

2. The method of claim 1, wherein the hyperparameters include one or more of the following: the number of hidden layers or units, learning rates, batch sizes, epochs parameters, dropout parameters, and regularization parameters.

3. The method of claim 1, further comprising using a simulator to simulate recommended actions and further refine the deep neural network model and the transition probability matrices.

4. The method of claim 1, wherein non-network data includes weather information.

5. The method of claim 1, wherein non-network data includes customer-related data.

6. The method of claim 1, wherein the Reinforcement Learning method is Q-based Reinforcement Learning.

7. A non-transitory computer-readable medium comprising a computer program, that, when executed by a computer system referred to as the "Analyzer," enables the computer system to perform the following method for providing early warning of future non-normal wireless network conditions and for providing recommendations for remedying predicted non-normal conditions, the method comprising:

the Analyzer receiving as input data imported from disparate sources into a data warehouse, wherein the imported data includes: (1) data related to network components; (2) key performance (KPI) indicators for the network and associated time stamps; and (3) non-network data;

the Analyzer building a semantic data model for the KPI indicators by enriching the KPI indicators with metadata;

the Analyzer performing data cleansing operations on the imported data;

the Analyzer using regression analysis and dimension reduction techniques on the cleansed, imported data to automatically identify significant network and non-network observational elements, network configuration parameters, and KPI indicators for use in defining a situation related to the network, wherein observational elements include network components IDs, location information for such network components, and environmental conditions in said locations;

the Analyzer creating vectors that each define a situation related to the network, wherein each vector comprises values for the identified significant network and non-network observational elements, network configuration parameters, and KPI indicators;

the Analyzer using unsupervised machine learning to build a statistical model that predicts the situations that result in non-normal network conditions, wherein building the statistical model comprises performing unsupervised clustering of the vectors based on network state;

the Analyzer generating a situations table based on unsupervised clustering results, wherein the table lists distinct, labeled situations and the cluster to which each situation corresponds;

the Analyzer creating a deep neural network model of situations ("the deep neural network model") by using deep neural networks to reconstruct the situations table in memory, resulting in further microclustering of the vectors and identification of one or more new situations;

the Analyzer importing new data from disparate sources into the data warehouse and creating a new situations table using the new data;

the Analyzer comparing the new situations table to the table reconstructed using the deep neural network model ("the DNN table") to determine how well the deep neural network model of situations predicted the new data;

the Analyzer applying a Reinforcement Learning method to the new and previously-imported data to guide the deep neural network model to understand how changes to network configuration parameters affect situations;

the Analyzer adjusting the hyperparameters of the deep neural network model based on the comparison of the new situations table to the DNN table accordingly;

the Analyzer retraining the deep neural networks model with the adjusted hyperparameters;

the Analyzer using the statistical model created from unsupervised clustering to predict a future non-normal network situation;

the Analyzer using the deep neural network model and Reinforcement Learning results to identifying one or more changes to network configuration parameters that has at least a threshold probability of moving the predicted non-normal situation to a normal network state; and the Analyzer displaying in a user interface an alert for the predicted non-normal network situation and a corresponding recommendation for remedying the predicted non-normal network situation, wherein the recommendation is based on the one or more identified changes to network configuration parameters that has at least a threshold probability of moving the predicted non-normal situation to a normal network state.

8. The non-transitory computer-readable medium of claim 7, wherein the hyperparameters include one or more of the following: the number of hidden layers or units, learning rates, batch sizes, epochs parameters, dropout parameters, and regularization parameters.

9. The non-transitory computer-readable medium of claim 7, further comprising using a simulator to simulate recommended actions and further refine the deep neural network model and the transition probability matrices.

10. The non-transitory computer-readable medium of claim 7, wherein non-network data includes weather information.

11. The non-transitory computer-readable medium of claim 7, wherein non-network data includes customer-related data.

12. The non-transitory computer-readable medium of claim 7, wherein the Reinforcement Learning method is Q-based Reinforcement Learning.

13. A computer system referred to as the "Analyzer" for providing early warning of future non-normal wireless network conditions and for providing recommendations for remedying predicted non-normal conditions, the system comprising:

one or more processors;

one or more memory units coupled to the one or more processors, wherein the one or more memory units store instructions that, when executed by the one or more processors, cause the Analyzer to perform the operations of:

receiving as input data imported from disparate sources into a data warehouse, wherein the imported data includes: (1) data related to network components; (2) key performance (KPI) indicators for the network and associated time stamps; and (3) non-network data;

building a semantic data model for the KPI indicators by enriching the KPI indicators with metadata;

performing data cleansing operations on the imported data;

using regression analysis and dimension reduction techniques on the cleansed, imported data to automatically identify significant network and non-network observational elements, network configuration parameters, and KPI indicators for use in defining a situation related to the network, wherein observational elements include network components IDs, location information for such network components, and environmental conditions in said locations;

creating vectors that each define a situation related to the network, wherein each vector comprises values for the identified significant network and non-network observational elements, network configuration parameters, and KPI indicators;

using unsupervised machine learning to build a statistical model that predicts the situations that result in non-normal network conditions, wherein building the statistical model comprises performing unsupervised clustering of the vectors based on network state;

generating a situations table based on unsupervised clustering results, wherein the table lists distinct, labeled situations and the cluster to which each situation corresponds;

creating a deep neural network model of situations ("the deep neural network model") by using deep neural networks to reconstruct the situations table in memory, resulting in further microclustering of the vectors and identification of one or more new situations;

importing new data from disparate sources into the data warehouse and creating a new situations table using the new data;

comparing the new situations table to the table reconstructed using the deep neural network model ("the DNN table") to determine how well the deep neural network model of situations predicted the new data;

applying a Reinforcement Learning method to the new and previously-imported data to guide the deep neural network model to understand how changes to network configuration parameters affect situations;

adjusting the hyperparameters of the deep neural network model based on the comparison of the new situations table to the DNN table accordingly;

retraining the deep neural networks model with the adjusted hyperparameters;

using the statistical model created from unsupervised clustering to predict a future non-normal network situation;

using the deep neural network model and Reinforcement Learning results to identifying one or more changes to network configuration parameters that has at least a threshold probability of moving the predicted non-normal situation to a normal network state; and displaying in a user interface an alert for the predicted non-normal network situation and a corresponding recommendation for remedying the predicted non-normal network situation, wherein the recommendation is based on the one or more identified changes to network configuration parameters that has at least a threshold probability of moving the predicted non-normal situation to a normal network state.

14. The system of claim 13, wherein the hyperparameters include one or more of the following: the number of hidden layers or units, learning rates, batch sizes, epochs parameters, dropout parameters, and regularization parameters.

15. The system of claim 13, further comprising using a simulator to simulate recommended actions and further refine the deep neural network model and the transition probability matrices.

16. The system of claim 13, wherein non-network data includes weather information.

17. The system of claim 13, wherein non-network data includes customer-related data.

18. The system of claim 13, wherein the Reinforcement Learning method is Q-based Reinforcement Learning.

\* \* \* \* \*